United States Patent Office 3,431,391
Patented Mar. 4, 1969

3,431,391
ELECTRODE NOZZLE
Elemir Ehrenstein, Bratislava, and Ivan Slabon, Modra, Czechoslovakia, assignors to Vyskumny Ustav Zvaracsky, Bratislava, Czechoslovakia
Filed Oct. 23, 1965, Ser. No. 504,262
U.S. Cl. 219—130                12 Claims
Int. Cl. B23k 9/00, 9/12

ABSTRACT OF THE DISCLOSURE

A nozzle for guiding elongated longitudinally movable electrodes in welding apparatus comprises elongated guide means in the form of a channel having a pair of spaced side walls and a transverse wall connecting the side walls. A tubular guide member is movably received in the channel and defines a passage through which the electrode passes to the actual welding station. Both the channel and the tubular guide member are arcuately curved in the direction of elongation thereof and the tubular guide member is substantially coextensive with the channel.

---

The present invention relates to nozzles in general. More specifically, it relates to a nozzle for a welding apparatus. Still more particularly, it relates to a nozzle for a slag-welding apparatus. The invention is particularly concerned with a nozzle for guiding an elongated longitudinally movable electrode in a welding apparatus.

In welding equipment, particularly of the type used for slag-welding, the electrode is consumed at a fast rate and must therefore be constantly replenished. This is accomplished by advancing an elongated electrode through a nozzle to the actual welding station. Since the speed at which the electrode is used up is relatively high and since the very long electrode, which may be withdrawn from a remote source of supply, must be firmly guided, it is known to pass the electrode through a suitable nozzle.

Two types of such guide nozzles are presently known to us. One type is constructed by forming a passage in a bar of suitable material, for example a bar of copper, and then deforming the bar so as to provide an arcuate shape which has been found advantageous for such nozzles. The other type utilizes steel tubing which is bent to the desired arcuate shape, and which may be reinforced with longitudinal ridges if desired.

Both types of nozzles are quite suitable for the purpose intended; however, both types of nozzles also have a common drawback. Specifically the movement of the electrode, which latter of course rubs against the circumferential wall of the nozzle, wears this wall through so that the entire nozzle must then be replaced. This is not economical and also requires a certain downtime for the welding apparatus every time the nozzle requires replacement. It should be understood, relative to the question of economy, that the use of simple tubing for such purposes is not practicable since such tubing does not have the necessary rigidity. Rather, the tubing must be either reinforced or the nozzle must be prepared from bar stock which is formed with a suitable passage. In both cases the expense is of course greater than if it were possible to use simple tubing.

It is therefore a general object of the present invention to overcome the above-mentioned drawbacks.

A more specific object of the invention is to provide a nozzle of the type described for guiding an elongated longitudinally movable electrode in a welding apparatus in such a manner that wear on the nozzle is reduced.

A still more specific object of the invention is to provide a nozzle of the above-mentioned type in which the wear resulting from longitudinal advancement of the electrode is taken up by specially provided expandable means which can be readily exchanged for new means of the same type, while preserving the more expensive basic nozzle structure.

In accordance with one feature of our invention we provide a nozzle for guiding an elongated longitudinally movable electrode in a welding apparatus, such nozzle being particularly suitable for use in a slag-welding apparatus and comprising an elongated guide means having a pair of spaced side walls and a web connecting the side walls and defining therewith an elongated channel. Disposed in this channel in removable relationship is a tubular guide member which defines a passage through which the electrode may pass to the actual welding station.

It will be obvious from what has just been stated that any wear will be confined to the tubular guide member which is received in the channel constituting the basic nozzle structure. This tubular guide member, which can be a simple section of a tube since it is reinforced by the surrounding walls of the channel, is so arranged that it can be readily replaced whenever it is worn through. Thus the basic nozzle structure, that is the channel, will not be affected by wear resulting from movement of the electrode.

Advantageously, the tubular guide member will not be held within the channel by separate holding means such as screws, welds and similar expedients. Rather, it will be freely received within the channel and will be retained therein by being pressed against the walls thereof, advantageously against the web of the channel, by a separate wall or similar element which extends parallel to both the tubular guide member and the channel. Thus, withdrawal of the wall will free the tubular guide member for immediate replacement.

In accordance with another feature of the invention the additional wall can be connected to the source of welding current required if both it and the tubular guide member are made of electrically conductive material, such as brass or bronze. In this case electricity will then be transmitted to the moving electrode by the intermediary of the tubular guide member and the additional wall holding the same against the web of the channel.

It is also advantageous to provide wear resistant means adjacent the open front end of the tubular guide member, since wear of the latter is most pronounced there. Also, the leading end of the electrode adjacent the actual welding station will advantageously be deflectable in its path to allow for various different operating conditions. In accordance with another feature of the invention we therefore also provide means for effecting such deflection.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
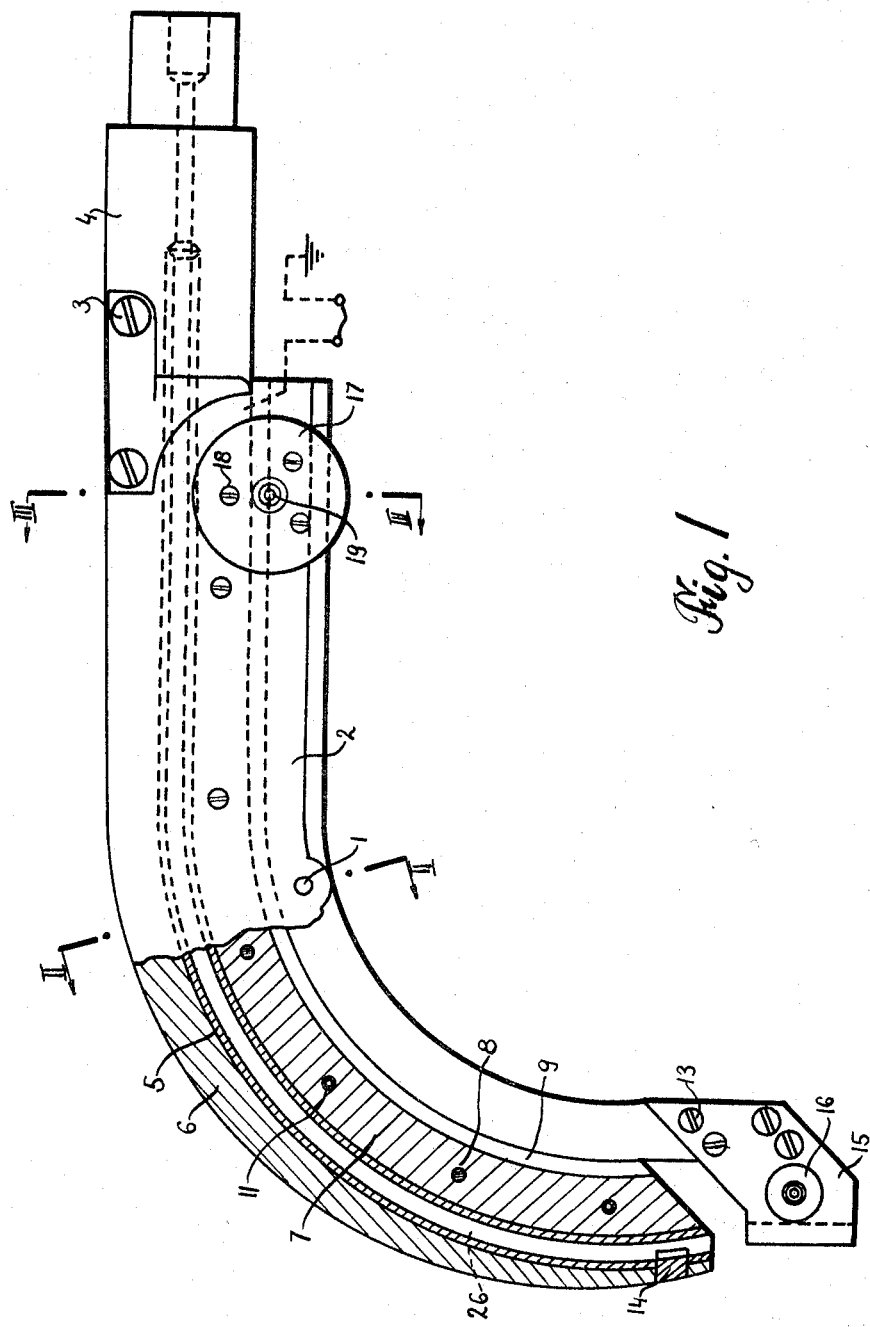
FIG. 1 is a side-elevational view, partly in section, of a nozzle embodying our invention.
Figure 2:
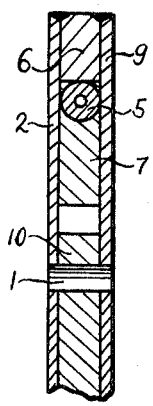
FIG. 2 is a section taken on the line II—II of FIG. 1.
Figure 3:
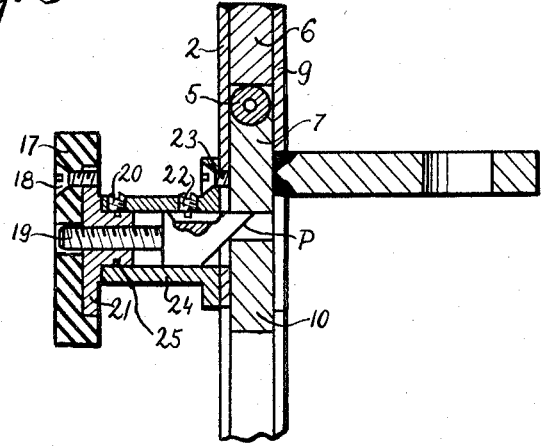
FIG. 3 is a section taken on the line III—III of FIG. 1.

Discussing now the drawing in detail, and firstly FIG. 1 thereof, it will be seen that there is provided an elongated guide means which is arcuately curved in longitudinal direction thereof. This guide means is a channel defined by a pair of spaced lateral walls 2, 9 and a transverse web 6, thus defining a construction which has a U-shaped cross-section. The tubular guide member 6 is disposed within this channel and is retained therein by being pressed against the web 6 by means of a further wall or member 7 which extends within the channel parallel to the web 6. The member 7 is secured to the lateral walls 2, 9 by means of screws 11 and pins 8 which extend through these walls into the member 7.

At its forward open end the tubular guide member 5 is provided in its circumferential wall, at that point at which the electrode passing through the guide member 5 normally causes the greatest wear, with an opening in which there is received a member 14 consisting of a material harder than the material of the guide member 5. Generally, the member 14 will be provided of a hard metal and may be soldered or otherwise suitably secured, for instance to the inner face of the web 6. Of course, it is also possible to form a corresponding opening in the web 6 and to dispose the member 14 in the aligned openings of the web and of the guide member 5. In this case the member 14 would then have to be suitably secured against movement and it will be obvious that this arrangement will permit removal and replacement of the member 14 from the exterior of the nozzle.

As has been pointed out before, the tubular guide member 5 and the member 7 are preferably of current-conductive material, in which case the member 7 can then be connected to a source of electrical current, so as to supply welding current to the electrode moving through the tubular guide member 5 via the intermediary of the members 5 and 7.

A deflecting means for deflecting the leading end of the electrode 26 (shown in phantom lines) is identified with reference numeral 10. It comprises an elongated lever which has a configuration corresponding to the arcuate curvature of the web 6 and which is also received between the lateral walls 2, 9 of the nozzle. This lever is pivoted to the lateral walls by means of a pivot connecting the respective walls and the lever transversely of the elongation of of the latter. That arm of the lever which is positioned forwardly of the pivot 1 carries at its front end, which is located adjacent the open end of the tubular guide member 5, an end portion 15 secured to the arm by means of screws 13. End portion 15, subject to deterioration under the heat developed in the welding process which takes place immediately adjacent the end portion 15, is replaceable by simply removing the screws 13 and putting a new end portion 15 in place. To maintain the members-to-be-welded out of contact with the current-conducting nozzle, end portion 15 carries a roller of an insulating material, for example of ceramic, which prevents such contact.

The second arm of the lever, that is the arm which is located rearwardly of the pivot point 1 is subject to manipulation by a control means. Such control means consists in the example of a guide sleeve 24 secured to one of the lateral walls, in the drawing this being lateral wall 2, in a direction normal to the elongation thereof. Screws 23 are provided for this purpose and extend into the lateral wall 2. Seated in this guide sleeve 24 is a spindle 19 having a forward end with a slanted cam face P. Spindle 19 is axially movable in opposite directions within the sleeve 24 and has its rear end received in a nut 21 with which it cooperates. Nut 21, which is provided with a neck received within the guide sleeve 24, is held therein by a screw 20 extending through the wall of the guide sleeve 24 and into a circumferential groove 25 formed in the neck portion of the nut 21. This, it will be seen, prevents axial movement of the nut 21 while permitting rotational movement thereof. A knob or wheel 17 of insulating material is secured to the nut 21 by means of screws 18 so that, upon rotation of the knob 17, the nut will also be rotated. It will be understood that cooperating internal and external threads are respectively provided on the nut 21 and the spindle 19 so that, when the nut 21 is rotated, the spindle 19 will be displaced in axial direction of the guide sleeve 24. To assure that the cam face P is always in proper position a second screw 22 extends through the circumferential wall of guide sleeve 24 and into a recess provided in the spindle 19, so as to permit axial movement of the same while preventing rotational movement. As the spindle 19 moves forward in the guide sleeve 24, that is in the direction towards the member 10, the cam face P of spindle 19 will deflect the second arm of the member 10 downwardly away from the member 7, whereby the first arm will be tilted and the end portion 15 will be angularly adjusted in its relationship to the open front end of the tubular guide member 5. Since under operating conditions the electrode abuts with its leading end against the end portion 15 it will be deflected thereby from its normal position. Conversely, when the knob 17 is rotated in a direction tending to withdraw the spindle in opposite direction through the guide sleeve 24, then the tendency of the electrode to return to its normal position will reset the deflecting means 10.

The entire nozzle is secured by means of screws $a$ to a neck portion 4 which in turn is fixed to the welding apparatus with which the inventive nozzle finds use.

The operation of the inventive device will be obvious from the above description. Electrode wire 26 is fed from a source of supply, which is not shown, through the tubular guide member 5. As soon as the leading end of the electrode wire 26 passes through the open end of the tubular guide member 5, it will abut against the front end portion 15 of the deflecting means 10 and is deflected thereby into the desired direction. If the knob 17 is rotated in a direction tending to displace the slanted cam face P into closer contact with the first arm of the member 10, then the front end portion 15 will deflect the electrode wire in the direction towards the left as seen in FIG. 1. Conversely, withdrawal of the spindle and its cam face P will permit the electrode wire to move towards the right as seen in FIG. 1.

It will be seen that the invention provides a nozzle in which all parts subject to wear, that is the tubular guide member 5, the member 14 of hard material, and the front end portion 15 of the deflector means 10, are readily replaceable, thereby eliminating much of the down-time ordinarily required for such replacement and at the same time providing a much longer life for the basic nozzle structure since only the replaceable and comparatively cheap portions of particular wear are affected. An additional advantage of the inventive construction is the fact that it can be very readily and economically constructed without requiring expensive machining steps.

It will be understood that each of the elements described above, or two or more together, may also find a useful application in other types of nozzles differing from the types described above.

While the invention has been illustrated and described as embodied in a nozzle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A nozzle for guiding an elongated longitudinally movable electrode in a welding apparatus, particularly a slag-welding apparatus, said nozzle comprising elongated guide means having a pair of spaced elongated side walls and an elongated longitudinally curved web connecting said side walls and defining therewith an elongated channel arcuately curved in the direction of elongation thereof; and a complementarily curved tubular guide member removably received in said channel substantially coextensive therewith and defining a passage through which said electrode may pass to the actual welding station.

2. A nozzle as defined in claim 1; and further comprising an additional wall received in said channel and maintaining said guide member therewithin in contact with said web.

3. A nozzle as defined in claim 1, wherein said tubular guide member is electrically conductive; and further comprising an additional wall of electrically conductive material received in said channel in electrically conductive contact with said guide member and maintaining the same positioned in abutment with said web; and a source of electrical energy connected to said additional wall whereby said electrode is supplied with electrical energy through the intermediary of the guide member and the additional wall.

4. A nozzle as defined in claim 3, wherein said guide member has a front end, portions of the circumferential wall of said guide member adjacent said front end being subject to wear as a result of sliding movement of said electrode over said portions; and further comprising wear resistant means located at said portions of the circumferential wall so as to relieve the latter from such wear.

5. A nozzle as defined in claim 4, wherein said wear resistant means is replaceable, when worn, with a new wear resistant means.

6. A nozzle as defined in claim 5, wherein said wear resistant means is replaceable from the exterior of said channel.

7. A nozzle as defined in claim 3; and further comprising straightening means having an end portion arranged adjacent said front end of said guide member for engaging and selectively straightening the leading end of said electrode.

8. A nozzle as defined in claim 7, wherein said deflecting means comprises a two-armed lever extending substantially parallel to said additional wall, said lever having a first arm and a second arm provided with said end portion, and said lever being pivoted to said lateral walls for angular displacement of said end portion relative to said front end of said guide member.

9. A nozzle as defined in claim 8, wherein said end portion of said deflecting means is removable so that, when said end portion becomes worn, it can be replaced with a new end portion.

10. A nozzle as defined in claim 8, wherein said end portion comprises insulating means which engages the members to be welded so as to prevent electrically conductive conduct between the latter and said nozzle.

11. A nozzle as defined in claim 8; and further comprising actuating means for selectively angularly displacing said end portion of said deflecting means relative to said open end of said guide member, so as to vary the deflection of the leading end of said electrode.

12. A nozzle as defined in claim 11, wherein said actuating means comprises cooperating nut and spindle means mounted on said channel for axial movement of said spindle means toward and away from said first arm of said lever transversely thereof, said spindle means being provided with a leading cam face which engages said first arm upon axial advancement of said spindle means and tilts said lever about its pivot, thereby angularly displacing said end portion of the second arm relative to said open end of the tubular guide member.

References Cited

UNITED STATES PATENTS

| | | | |
|---|---|---|---|
| 2,179,108 | 11/1939 | Westberg | 219—130 |
| 2,756,310 | 7/1956 | Galbraith | 219—130 |
| 2,827,550 | 3/1958 | Unrath | 219—74 X |
| 2,829,236 | 4/1958 | Miles | 219—74 |
| 3,038,059 | 6/1962 | Hinrichs | 219—130 |
| 3,112,392 | 11/1963 | Orr et al. | 219—130 |
| 3,172,991 | 3/1965 | Arnoldy | 219—130 |
| 3,213,261 | 10/1965 | Anderson | 219—130 X |

RICHARD M. WOOD, *Primary Examiner.*

J. G. SMITH. *Assistant Examiner.*